(12) United States Patent
Lee et al.

(10) Patent No.: US 10,946,589 B2
(45) Date of Patent: Mar. 16, 2021

(54) OPTICAL FILM ATTACHMENT SYSTEM

(71) Applicant: LG CHEM, LTD., Seoul (KR)

(72) Inventors: Beom Seok Lee, Daejeon (KR); Ju Young Jeoung, Daejeon (KR); Kyoung Sik Kim, Daejeon (KR); Hang Suk Choi, Daejeon (KR); Eung Jin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/650,742

(22) PCT Filed: Sep. 14, 2018

(86) PCT No.: PCT/KR2018/010816
§ 371 (c)(1),
(2) Date: Mar. 25, 2020

(87) PCT Pub. No.: WO2019/066334
PCT Pub. Date: Apr. 4, 2019

(65) Prior Publication Data
US 2020/0307117 A1    Oct. 1, 2020

(30) Foreign Application Priority Data
Sep. 26, 2017 (KR) .......................... 10-2017-0123998

(51) Int. Cl.
*G01N 21/00* (2006.01)
*B29C 65/82* (2006.01)
(Continued)

(52) U.S. Cl.
CPC ......... *B29C 65/8253* (2013.01); *G01N 21/95* (2013.01); *G01N 2021/9513* (2013.01); *G02F 1/1303* (2013.01)

(58) Field of Classification Search
CPC ................ B29C 65/8253; G01N 21/95; G01N 2021/9513; G02F 1/1303; B65C 9/00; B65C 9/40
See application file for complete search history.

(56) References Cited

U.S. PATENT DOCUMENTS

| | | | | |
|---|---|---|---|---|
| 4,599,740 A | * | 7/1986 | Cable ............... | G01V 5/0016 378/57 |
| 2006/0011304 A1 | * | 1/2006 | Nung ............... | B32B 37/003 156/538 |
| 2011/0083789 A1 | * | 4/2011 | Nakazono ......... | B32B 41/00 156/64 |

FOREIGN PATENT DOCUMENTS

| | | |
|---|---|---|
| JP | 2003-315527 A | 11/2003 |
| JP | 2015-40782 A | 3/2015 |

(Continued)

*Primary Examiner* — Abdullahi Nur
(74) *Attorney, Agent, or Firm* — Dentons US LLP

(57) ABSTRACT

Exemplary embodiments of the present invention provide an optical film attachment system which is connected to a downstream device and includes a panel conveyance path, the optical film attachment system including: a connection unit which connects the panel conveyance path and the downstream device and conveys the panel; a first inspection unit which is positioned on the panel conveyance path and finds out whether the panel with the attached optical film has a defect; and a second inspection unit which is positioned at a position spaced apart from the panel conveyance path and re-inspects a defect-determined panel determined as a defective panel by inspection by the first inspection unit; in which the connection unit includes a main conveyance path in which a first conveyance unit and a second conveyance unit are sequentially arranged in a conveyance direction of the panel conveyance path, a first auxiliary conveyance path which connects the first conveyance unit and the second inspection unit and is bypassed from the main conveyance path, and a second auxiliary conveyance path which is connected to the second conveyance unit and bypassed from the main conveyance path, the control unit controls the connection unit so that the defect-determined panel is conveyed from the first conveyance unit to the second inspection unit along the first auxiliary conveyance path when the (Continued)

panel inspected by the first inspection unit is determined as a defective panel, and a good-quality-determined panel determined as a good-quality panel by the first inspection unit is conveyed from the second conveyance unit along the second auxiliary conveyance path when it is difficult to convey the good-quality-determined panel to the downstream device.

9 Claims, 4 Drawing Sheets

(51) Int. Cl.
*G01N 21/95* (2006.01)
*G02F 1/13* (2006.01)

(56) References Cited

FOREIGN PATENT DOCUMENTS

| | | | |
|---|---|---|---|
| JP | 2015-074463 | A | 4/2015 |
| KR | 10-2009-0060347 | A | 6/2009 |
| KR | 10-2010-0115677 | A | 10/2010 |
| KR | 10-1435126 | B1 | 9/2014 |
| KR | 10-2015-0005627 | A | 1/2015 |
| KR | 10-2015-0020234 | A | 2/2015 |
| KR | 10-2015-0042119 | A | 4/2015 |
| KR | 10-2016-0005243 | A | 1/2016 |
| KR | 10-2017-003214 | A | 1/2017 |
| TW | 201522932 | A | 6/2015 |

* cited by examiner

[Figure 1]
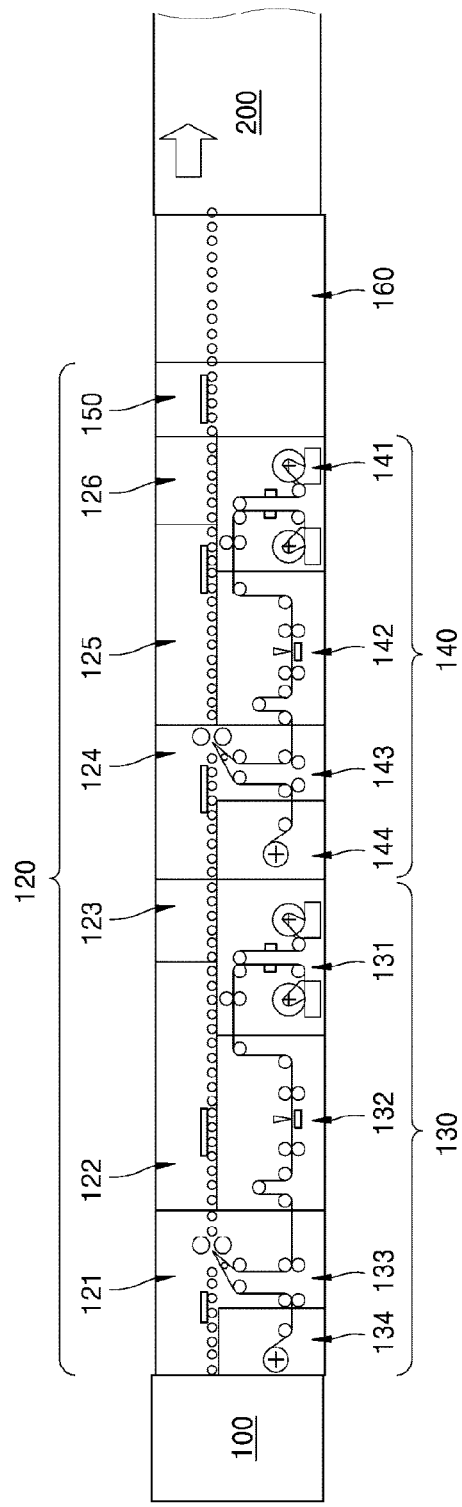

[Figure 2]
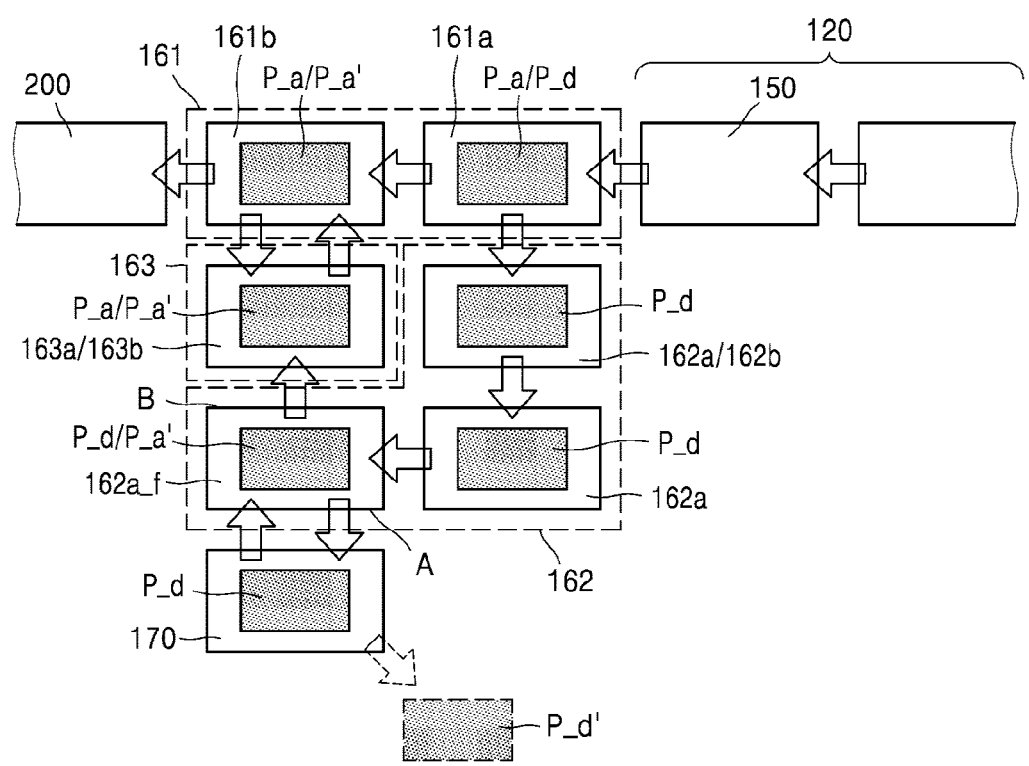

[Figure 3A]
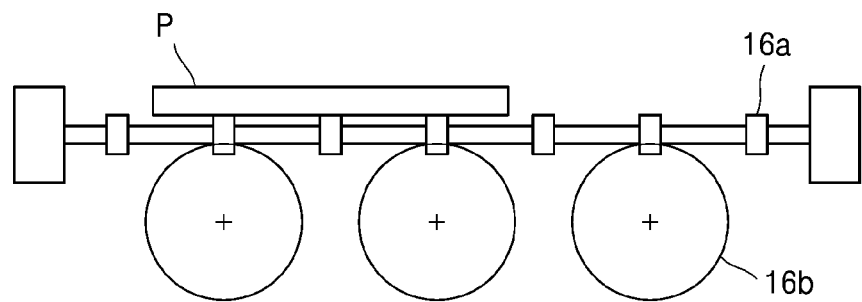
[Figure 3B]
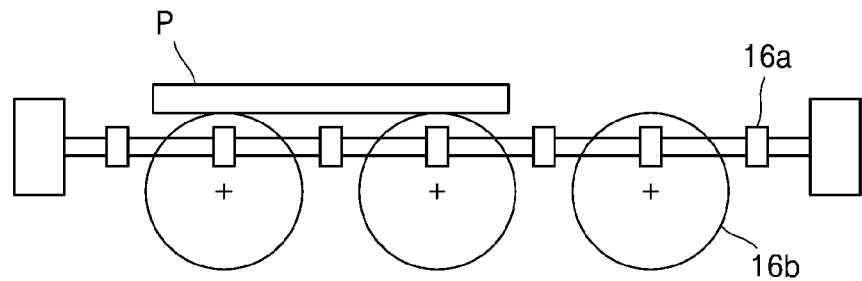
[Figure 4]
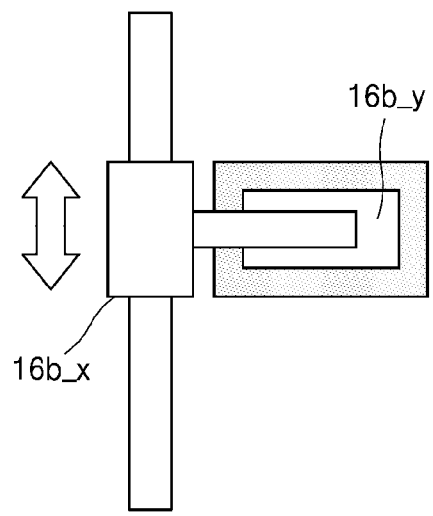

[Figure 5]
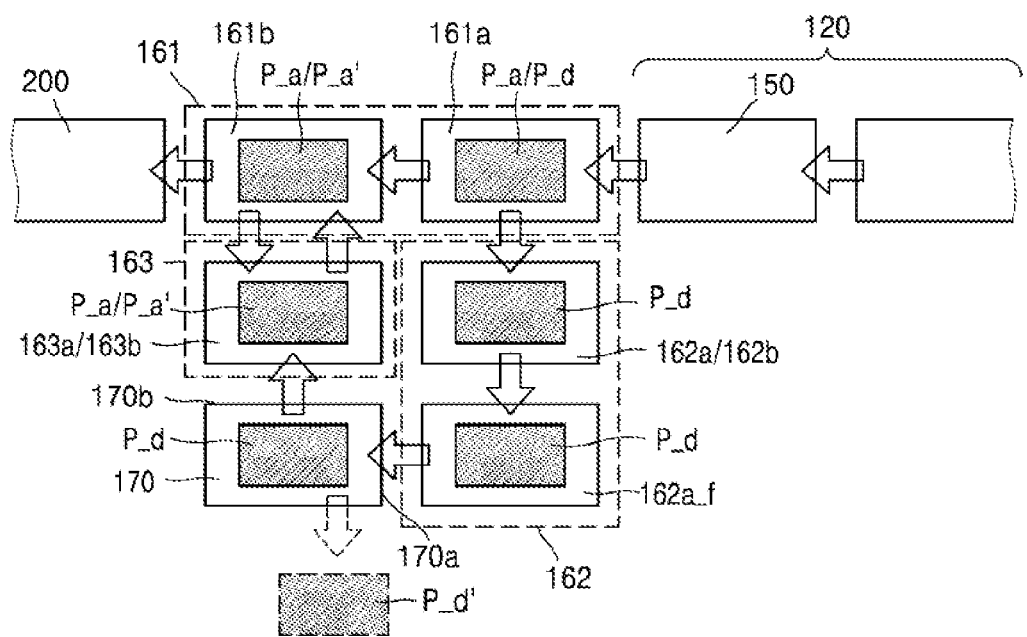

OPTICAL FILM ATTACHMENT SYSTEM

The present application is a National Phase entry pursuant to 35 U.S.C. § 371 of International Application No. PCT/KR2019/010816 filed Sep. 14, 2018, and claims priority to and the benefit of Korean application No. 10-2017-0123998 filed Sep. 26, 2017, the entire contents of both are incorporated herein by reference in their entirety.

FIELD

The present invention relates to an optical film attachment system which attaches an optical film to a panel and conveys the panel.

BACKGROUND

Recently, research is being actively conducted to improve production efficiency of an optical film attachment system that manufactures an optical display element by attaching an optical film to a panel.

Meanwhile, it may be necessary to perform a post-process, such as a process of mounting a driving chip that performs a display function by being operated by electric power on the optical display element, which is manufactured by attaching the optical film to the panel.

To meet this requirement, the optical film attachment system may be connected to a downstream device for performing the aforementioned post-process. However, the speed of the process of attaching the optical film, and the speed of the post-process performed by the downstream device, may be different from each other.

To continuously perform the processes, the process of attaching the optical film and the post-process performed by the downstream device are accompanied by conveyance of the panel, but the difference in speed between the processes adversely affects the continuous and smooth conveyance of the panel, and as a result, there may occur a problem in that efficiency of any one of the two processes deteriorates.

Meanwhile, the optical film attachment system also performs a process of inspecting the panel to which the optical film attached, in addition to the process of attaching the optical film, and during the entire process of attaching the optical film the conveyance of the panel is affected by the speed of the inspection of the panel and the speed at which good quality/defective products are sorted.

SUMMARY

Exemplary embodiments of the present invention provide an optical film attachment system which is continuously connected to an optical display unit manufacturing device and implements efficient conveyance of a panel by considering the speed at which the panel to which an optical film is attached is inspected and/or a process ability of the optical display unit manufacturing device.

Exemplary embodiments of the present invention provide an optical film attachment system which is connected to a downstream device and includes a panel conveyance path for conveying a panel and attaching an optical film to the panel, the optical film attachment system including: a connection unit which connects the panel conveyance path and the downstream device and conveys the panel; a first inspection unit which is positioned on the panel conveyance path and determines whether the panel with the attached optical film has a defect; a second inspection unit which is positioned at a position spaced apart from the panel conveyance path and re-inspects a defect-determined panel determined as a defective panel by inspection by the first inspection unit; and a control unit which controls the connection unit to adjust the conveyance of the panel, in which the connection unit includes a main conveyance path in which a first conveyance unit and a second conveyance unit are sequentially arranged in a conveyance direction of the panel conveyance path, a first auxiliary conveyance path which connects the first conveyance unit and the second inspection unit and is bypassed from the main conveyance path, and a second auxiliary conveyance path which is connected to the second conveyance unit and bypassed from the main conveyance path, the control unit controls the connection unit so that the defect-determined panel is conveyed from the first conveyance unit to the second inspection unit along the first auxiliary conveyance path when the panel inspected by the first inspection unit is determined as a defective panel, and the control unit controls the connection unit so that a good-quality-determined panel determined as a good-quality panel by the first inspection unit is conveyed from the second conveyance unit along the second auxiliary conveyance path when it is difficult to convey the good-quality-determined panel to the downstream device.

In the present exemplary embodiment, the first auxiliary conveyance path may include a first buffer unit that stores the defect-determined panel conveyed from the first conveyance unit when the re-inspection by the second inspection unit pauses.

In the present exemplary embodiment, the defect-determined panel conveyed from the first conveyance unit may be conveyed to the second inspection unit via the first buffer unit when the second inspection unit is in an idle state, the defect-determined panel conveyed from the first conveyance unit may be stored in the first buffer unit when the re-inspection by the second inspection unit pauses, and the defect-determined panel stored in the first buffer unit may be conveyed to the second inspection unit when the conveyance of the panel positioned at an upstream side of the first buffer unit is delayed.

In the present exemplary embodiment, the panel positioned on the second conveyance unit may be conveyed to the downstream device when the downstream device is in an idle state, the panel positioned on the second conveyance unit may be conveyed along the second auxiliary conveyance path when the downstream device pauses, and the panel positioned on the second auxiliary conveyance path may be conveyed to the second conveyance unit when the conveyance of the panel positioned at an upstream side of the second conveyance unit is delayed.

In the present exemplary embodiment, a good-quality-confirmed panel confirmed as a good-quality panel by re-inspection by the second inspection unit may be conveyed to the second conveyance unit along the second auxiliary conveyance path.

In the present exemplary embodiment, the second auxiliary conveyance path may include a second buffer unit that stores the panel conveyed from the second conveyance unit.

In the present exemplary embodiment, the second buffer unit may store a good-quality-confirmed panel confirmed as a good-quality panel by re-inspection by the second inspection unit.

In the present exemplary embodiment, the good-quality-confirmed panel conveyed from the second inspection unit may be stored in the second buffer unit while the panel is conveyed from the first conveyance unit to the second conveyance unit.

In the present exemplary embodiment, the conveyance of the good-quality-confirmed panel from the second inspection unit to the second auxiliary conveyance path may be stopped while the panel is conveyed from the second conveyance unit along the second auxiliary conveyance path.

According to the exemplary embodiments of the present invention, the optical film attachment system is connected to the downstream device via the connection unit, the defect-determined panel is conveyed to the second inspection unit through at least the first conveyance unit of the connection unit, and the good-quality-determined panel is conveyed to the downstream device through the second conveyance unit of the connection unit which is positioned at a downstream side of the first conveyance unit, such that reliability of inspection of the panel with the attached optical film is improved, and the conveyance of the good-quality-determined panel is not hindered, and as a result, it is possible to sufficiently ensure efficiency in conveying the panel.

In addition, it is possible to temporarily divert the good-quality-determined panel from the main conveyance path by using the second auxiliary conveyance path even though a process speed of the optical film attachment system is higher than a process speed of the optical display unit manufacturing device positioned at a downstream side of the optical film attachment system based on a conveying speed of the panel, and as a result, it is possible to sufficiently exhibit a process ability of the optical film attachment system.

BRIEF DESCRIPTION OF THE DRAWINGS

FIG. 1 is a conceptual view for explaining an optical film attachment system according to an exemplary embodiment of the present invention.

FIG. 2 is a conceptual view for explaining a first inspection unit, a connection unit, and a second inspection unit according to a first exemplary embodiment.

FIG. 3A and FIG. 3B are conceptual views briefly illustrating different states in which a first conveyance unit and a second conveyance unit according to the exemplary embodiment are operated.

FIG. 4 is a conceptual view briefly illustrating a state of a first conveyance unit and a second conveyance unit according to another exemplary embodiment are operated.

FIG. 5 is a conceptual view for explaining a first inspection unit, a connection unit, and a second inspection unit according to a second exemplary embodiment.

DETAILED DESCRIPTION

The present invention will be apparent with reference to exemplary embodiments to be described below in detail together with the accompanying drawings. However, the present invention is not limited to exemplary embodiments disclosed herein but will be implemented in various forms. The exemplary embodiments are provided so that the present invention is completely disclosed, and a person of ordinary skilled in the art can fully understand the scope of the present invention. Therefore, the present invention will be defined only by the scope of the appended claims. Meanwhile, the terms used in the present specification are for explaining the exemplary embodiments, not for limiting the present invention. Unless particularly stated otherwise in the present specification, a singular form also includes a plural form. In addition, the terms such as "comprises (includes)" and/or "comprising (including)" used in the specification do not exclude presence or addition of one or more other constituent elements, steps, operations, and/or elements, in addition to the mentioned constituent elements, steps, operations, and/or elements. The terms such as "first" and "second" may be used to describe various constituent elements, but the constituent elements should not be limited by the terms. These terms are used only to distinguish one constituent element from another constituent element.

FIG. 1 is a conceptual view for explaining an optical film attachment system according to an exemplary embodiment of the present invention, and FIG. 2 is a conceptual view for explaining a first inspection unit, a connection unit, and a second inspection unit according to a first exemplary embodiment.

Referring to FIGS. 1 and 2, an optical film attachment system 100 according to the exemplary embodiment of the present invention is a system that manufactures an optical display element by attaching an optical film to a liquid crystal panel. The optical film attachment system 100 may constitute a continuous optical display unit manufacturing system by being continuously connected to an optical display unit manufacturing device 200 as a downstream device. Here, the optical display unit manufacturing device 200, as the downstream device, may be, for example, a device for mounting an optical display element driving chip (tape automated bonding (TAB)) on the optical display element.

The optical film attachment system 100 may include a panel supply unit 110 for supplying a panel, a panel conveyance path 120, a first optical film conveyance path 130, a second optical film conveyance path 140, and a connection unit 160. Here, the panel supply unit 110, the panel conveyance path 120, and a main conveyance path 161 of the connection unit 160, which will be described below, are connected sequentially in series, such that an optical film may be attached to the panel supplied from the panel supply unit 110 and then the panel may be continuously conveyed to the optical display unit manufacturing device 200 which is the downstream device.

The panel conveyance path 120 may be a conveyance path provided to convey the panel supplied from the panel supply unit 110 and attach the optical film to the panel. The panel conveyance path 120 may include a first optical film attaching unit 121 which attaches a first optical film to the panel, a panel turning/reversing unit 122 which is disposed at a downstream side of the first optical film attaching unit 121 and horizontally rotates and/or reverses, upside down, the panel having the optical film attached to one surface thereof, a first optical film attachment position measuring unit 123 which is disposed at a downstream side of the panel turning/reversing unit 122 and measures an attachment position of the first optical film, a second optical film attaching unit 124 which is disposed at a downstream side of the first optical film attachment position measuring unit 123 and attaches a second optical film to the panel, a panel reversing unit 125 which is disposed at a downstream side of the second optical film attaching unit 124 and reverses the panel having the optical films attached to both surfaces thereof, and a second optical film attachment position measuring unit 126 which is disposed at a downstream side of the panel reversing unit 125 and measures an attachment position of the second optical film.

The first optical film conveyance path 130 may include a first optical film supply unit 131 which is disposed at a most upstream side of the first optical film conveyance path 130 and supplies the first optical film, a first optical film cutting unit 132 which is disposed at a downstream side of the first optical film supply unit 131 and cuts the first optical film supplied from the first optical film supply unit 131, and a first carrier film winding unit 133 which is disposed at a most downstream side of the first optical film conveyance path 130 and winds a first carrier film separated from the first optical film in order to attach the first optical film to the panel.

The second optical film conveyance path 140 may include a second optical film supply unit 141 which is disposed at a most upstream side of the second optical film conveyance path 140 and supplies the second optical film, a second optical film cutting unit 142 which is disposed at a downstream side of the second optical film supply unit 141 and cuts the second optical film supplied from the second optical film supply unit 141, and a second carrier film winding unit 143 which is disposed at a most downstream side of the second optical film conveyance path 140 and winds a second carrier film separated from the second optical film in order to attach the second optical film to the panel.

The optical film attachment system 100 may include a first inspection unit 150, a connection unit 160, a second inspection unit 170, and a control unit (not illustrated).

The first inspection unit 150 is positioned on the panel conveyance path 120 and may determine whether a panel P with the attached optical film has a defect. For example, the first inspection unit 150 may find out whether the panel P with the attached optical film has a defect through an automatic optical inspection (AOI) that automatically determines whether the panel has a defect based on a predetermined optical inspection reference. Further, the first inspection unit 150 may transmit, to the predetermined control unit, the determination result, that is, a result of determining whether the inspected panel is a good-quality-determined panel P_a or a defect-determined panel P_d.

The connection unit 160 may connect the panel conveyance path 120 and the optical display unit manufacturing device 200 which is the downstream device and provide a predetermined path that may temporarily store or divert the panel P before the panel P to which the optical films are attached through the panel conveyance path 120 is conveyed to the optical display unit manufacturing device 200 which is the downstream device.

Since the optical film attachment system 100 is connected to the downstream device 200 via the connection unit 160, the panel conveyed through the panel conveyance path 120 may be temporarily stored or diverted by the connection unit 160, such that a process speed of the optical film attachment system 100 need not be decreased to match with a process speed of the optical display unit manufacturing device 200 which is the downstream device even though the process speed of the optical film attachment system 100 is higher than the process speed of the optical display unit manufacturing device 200 which is the downstream device at the downstream side. As a result, a process ability of the continuous optical display unit manufacturing system 1000 may be sufficiently exhibited.

Specifically, for example, in a case in which the process speed of the downstream device 200 is lower than the process speed of the optical film attachment system 100, the panel to which the optical films have already been attached may be temporarily stored or diverted by using the connection unit 160 installed between the first inspection unit 150 and the downstream device 200. Therefore, it is possible to prevent problems in that the panel to which the optical films have been completely attached remains in the first inspection unit 150 as the downstream device 200 cannot keep up with the process speed of the optical film attachment system 100 because the process speed of the optical film attachment system 100 is higher than the process speed of the downstream device 200, such that the process speed of the optical film attachment system 100 is decreased and the processability of the optical film attachment system 100 cannot be sufficiently exhibited.

Meanwhile, the first inspection unit 150 automatically determines whether the panel has a defect based on the predetermined optical inspection reference, and a panel, which may be sorted as a good-quality panel based on a good-quality reference during actual mass-production, or may be included in the defect-determined panels P_d determined as a defective panel.

The second inspection unit 170 is positioned at a position spaced apart from the panel conveyance path 120 and may re-inspect the defect-determined panel P_d which has been determined as a defective panel by the first inspection unit 150. For example, in the second inspection unit 170, an operator is disposed to perform the optical inspection on the defect-determined panel P_d, thereby determining whether there is a defect with the naked eye of the operator. By the re-inspection, the defect-determined panel P_d, which has been determined as a defective panel by the first inspection unit 150, may be sorted and determined as a panel (hereinafter, referred to as a good-quality-confirmed panel P_a') which is sorted as a good-quality panel based on the good-quality reference during the actual mass-production, or a defect-confirmed panel P_d' which is sorted as a defective panel. The operator may manually input and transmit the result to the predetermined control unit.

A control unit (not illustrated) controls the connection unit 160 to adjust a conveyance environment of the panel. For example, the control unit may allow the defect-determined panel P_d, which has been determined as the defective panel by the first inspection unit 150, to be conveyed to the second inspection unit 170 through the connection unit 160, or the control unit may prevent the good-quality-determined panel P_a, which has been determined as the good-quality panel by the first inspection unit 150, from being conveyed directly to the downstream device through the connection unit 160 in a case in which it is difficult to convey the good-quality-determined panel P_a to the downstream device (e.g., in a case in which the downstream device is busy or stopped). In accordance with the exemplary embodiments, the control unit may be implemented in various forms such as a circuit board, an integrated circuit chip, a series of computer programs installed in hardware, firmware, and software for controlling the connection unit 160.

Meanwhile, the connection unit 160 may include a main conveyance path 161, a first auxiliary conveyance path 162, and a second auxiliary conveyance path 163.

The main conveyance path 161 is configured such that a first conveyance unit 161*a* and a second conveyance unit 161*b* are sequentially arranged in a conveyance direction of the panel conveyance path 120, such that the good-quality-determined panel P_a, to which the optical films have been attached and which has been determined as the good-quality panel by the first inspection unit 150, may be conveyed to the downstream device 200.

The first conveyance unit 161*a* is installed at a downstream side of the panel conveyance path 120 and may convey the good-quality-determined panel P_a, which has been determined as the good-quality panel by the first inspection unit 150, to the second conveyance unit 161*b* installed at a downstream side of the first conveyance unit 161*a*. In addition, the first conveyance unit 161*a* is further connected to the first auxiliary conveyance path 162 to be described below and may convey the defect-determined panel P_b, which has been determined as the defective panel by the first inspection unit 150, to the second inspection unit 170.

As illustrated in FIGS. 3A and 3B, the first conveyance unit 161a may include a conveyance device having a double roller structure in which rollers have central axes orthogonal to each other and rotate. Specifically, the first conveyance unit 161a may include a first conveyance device 16a and a second conveyance device 16b that constitute the double roller structure.

The first conveyance device 16a is a conveyance device including conveying rollers and may convey the good-quality-determined panel P_a, which has been determined as the good-quality panel, to the second conveyance unit 161b. The first conveyance device 16a is configured such that the multiple conveying rollers are rotatably installed on a conveying roller shaft to constitute one row of conveying rollers, and multiple rows of conveying rollers are disposed in parallel to be spaced apart from one another at predetermined intervals in the conveyance direction of the panel conveyance path 120. As a result, the first conveyance device 16a may convey the good-quality-determined panel P_a to the second conveyance unit 161b in the conveyance direction of the panel conveyance path 120.

The second conveyance device 16b is a conveyance device including conveying rollers and may convey the defect-determined panel P_b, which has been determined as the defective panel, to the second inspection unit 170 via the first auxiliary conveyance path 162. The second conveyance device 16b is configured such that the multiple conveying rollers are rotatably installed on a conveying roller shaft to constitute one row of conveying rollers and multiple rows of conveying rollers are disposed in parallel to be spaced apart from one another at predetermined intervals in a direction horizontally orthogonal to the conveyance direction of the panel conveyance path 120. As a result, the second conveyance device 16b may convey the defect-determined panel P_d to the second inspection unit 170 via the first auxiliary conveyance path 162 in the direction horizontally orthogonal to the conveyance direction of the panel conveyance path 120.

More specifically, when viewed from the top side in a top plan view, the row of the conveying rollers of the first conveyance device 16a and the row of the conveying rollers of the second conveyance device 16b may be disposed to be orthogonal to each other.

In addition, an interval between the rows of the conveying rollers of the first conveyance device 16a is at least larger than a thickness of the conveying roller of the second conveyance device 16b, such that the conveying roller of the second conveyance device 16b may pass between the rows of the conveying rollers of the first conveyance device 16a.

Further, an interval between the conveying rollers of the second conveyance device 16b is at least larger than a diameter of the conveying roller of the first conveyance device 16a, such that the conveying roller of the first conveyance device 16a may pass between the rows of the conveying rollers of the second conveyance device 16b.

Therefore, the second conveyance device 16b may be moved upward and downward without interfering with the first conveyance device 16a.

Here, a diameter of the conveying roller constituting the second conveyance device 16b may be larger than a diameter of the conveying roller constituting the first conveyance device 16a.

The first conveyance unit 161a may further include a first switching device for switching the first conveyance device 16a and the second conveyance device 16b.

When the panel inspected by the first inspection unit 150 is determined as the good-quality panel, the control unit may control the connection unit 160 so that the good-quality-determined panel P_a may be conveyed to the second conveyance unit 161b via the first conveyance unit 161a. In this case, as illustrated in FIG. 3A, the first conveyance device 16a is positioned above the second conveyance device 16b, that is, a surface of the conveying roller constituting the first conveyance device 16a is higher than a surface of the conveying roller constituting the second conveyance device 16b. Therefore, the panel may be conveyed to the downstream side, that is, the second conveyance unit 161b by using the first conveyance device 16a.

When the panel inspected by the first inspection unit 150 is determined as the defective panel, the control unit may control the connection unit 160 so that the defect-determined panel P_d may be conveyed from the first conveyance unit 161a to the second inspection unit 170 along the first auxiliary conveyance path 162. In this case, as illustrated in FIG. 3B, the control unit raises a position of the second conveyance device 16b by using the first switching device, such that the surface of the conveying roller constituting the second conveyance device 16b becomes higher than the surface of the conveying roller of the first conveyance device 16a, and as a result, the defect-determined panel P_d may be conveyed by using the second conveyance device 16b from the first conveyance unit 161a of the main conveyance path 161 to the second inspection unit 170 along the first auxiliary conveyance path 162.

The control unit also allows the defect-determined panel P_d to be conveyed from the first conveyance unit 161a to the second inspection unit 170 along the first auxiliary conveyance path 162. Then, when a subsequent panel inspected by the first inspection unit 150 is determined as the good-quality panel, the control unit switches the double roller structure of the first conveyance unit 161a by using the first switching device (not illustrated), that is, the control unit raises a position of the first conveyance device 16a by using the first switching device so that the surface of the conveying roller constituting the first conveyance device 16a becomes higher than the surface of the conveying roller of the second conveyance device 16b, such that the good-quality-determined panel P_a may be conveyed by using the first conveyance device 16a from the first conveyance unit 161a of the main conveyance path 161 to the second conveyance unit 161b of the main conveyance path 161.

Therefore, the first conveyance unit 161a may be used, and simultaneously, the conveyance along the main conveyance path 161 and the conveyance along the first auxiliary conveyance path 162 may be implemented.

As another exemplary embodiment, the first conveyance unit 161a may include the first conveyance device 16a illustrated in FIGS. 3A and 3B and the second conveyance device 16b illustrated in FIG. 4. For example, the first conveyance device 16a includes the conveying rollers to convey the good-quality-determined panel P_a from the first conveyance unit 161a to the second conveyance unit 161b. The second conveyance device 16b may convey the defect-determined panel P_d to the second inspection unit 170 through the first auxiliary conveyance path 162 by using a robot arm 16b_x and a panel fixing unit 16b_y mounted on the robot arm 16b_x.

Hereinafter, for convenience of description, it is assumed that the first conveyance unit 161a includes the first conveyance device 16a and the second conveyance device 16b that constitute the double roller structure, as illustrated in FIGS. 3A and 3B.

The second conveyance unit 161b is installed at a downstream side of the first conveyance unit 161a and may convey the good-quality-determined panel P_a, which is conveyed from the first conveyance unit 161a via the panel conveyance path 120, to the downstream device 200. In addition, the second conveyance unit 161b is further connected to the second auxiliary conveyance path 163 to be described below and may convey the good-quality-determined panel P_a to the second auxiliary conveyance path 163.

The structure of the second conveyance unit 161b is similar to the structure of the first conveyance unit 161a, and the second conveyance unit 161b includes the first conveyance device 16a and the second conveyance device 16b and may switch the first conveyance device 16a and the second conveyance device 16b by using a second switching device. For example, the first conveyance device 16a of the second conveyance unit 161b includes the conveying rollers and may convey the good-quality-determined panel P_a to the downstream device 200. The second conveyance device 16b of the second conveyance unit 161b includes the conveying rollers and may convey the good-quality-determined panel P_a to the second auxiliary conveyance path 163.

When comparing operational principles of the second conveyance unit 161b and the first conveyance unit 161a, the operational principles are basically similar to each other except that the first conveyance unit 161a conveys the defect-determined panel P_d to the first auxiliary conveyance path 162 and the second conveyance unit 161b conveys the good-quality-determined panel P_a to the second auxiliary conveyance path 163 or returns the panel (e.g., the good-quality-determined panel P_a or the good-quality-confirmed panel P_a') from the second auxiliary conveyance path 163. Therefore, a detailed description thereof will be omitted.

Meanwhile, during a typical process of conveying the panel when the downstream device 200 is in an idle state, the control unit may control the connection unit 160 so that the good-quality-determined panel P_a conveyed from the first conveyance unit 161a may be conveyed to the downstream device 200 via the second conveyance unit 161b. In this case, as illustrated in FIG. 3A, the first conveyance device 16a is positioned above the second conveyance device 16b, that is, the surface of the conveying roller constituting the first conveyance device 16a is higher than the surface of the conveying roller constituting the second conveyance device 16b. Therefore, the panel may be conveyed to the downstream side, that is, the downstream device 200 by using the first conveyance device 16a.

In a case in which the downstream device 200 pauses (for example, the downstream device 200 is busy or stopped), the control unit may control the connection unit 160 so that the good-quality-determined panel P_a, which has been conveyed from the first conveyance unit 161a and positioned on the second conveyance unit 161b, may be conveyed along the second auxiliary conveyance path 163. In this case, as illustrated in FIG. 3B, the control unit raises a position of the second conveyance device 16b by using the second switching device, such that the surface of the conveying roller constituting the second conveyance device 16b becomes higher than the surface of the conveying roller of the first conveyance device 16a, and as a result, the good-quality-determined panel P_a may be conveyed by using the second conveyance device 16b from the second conveyance unit 161b of the main conveyance path 161 to the second auxiliary conveyance path 163.

In addition, in a case in which the conveyance of the panel positioned at an upstream side of the second conveyance unit 161b is delayed, the control unit may control the connection unit 160 so that the panel (e.g., the good-quality-determined panel P_a or the good-quality-confirmed panel P_a') positioned on the second auxiliary conveyance path 163 may be conveyed to the second conveyance unit 161b. In this case, the control unit switches the double roller structure of the second conveyance unit 161b by using the second switching device (not illustrated), that is, the control unit raises the position of the first conveyance device 16a by using the second switching device so that the surface of the conveying roller constituting the first conveyance device 16a becomes higher than the surface of the conveying roller of the second conveyance device 16b, and as a result, the good-quality-determined panel P_a or the good-quality-confirmed panel P_a' may be returned by using the first conveyance device 16a from the second auxiliary conveyance path 163 to the second conveyance unit 161b of the main conveyance path 161.

Therefore, the second conveyance unit 161b may be used, and simultaneously, the conveyance along the main conveyance path 161 and the conveyance along the second auxiliary conveyance path 163 may be implemented.

The first auxiliary conveyance path 162 connects the first conveyance unit 161a and the second inspection unit 170, thereby forming a conveyance path bypassed from the main conveyance path 161. The first auxiliary conveyance path 162 may include at least one first auxiliary conveyance unit 162a.

The multiple first auxiliary conveyance units 162a may be connected to one another in series to form a conveyance path through which the defect-determined panel P_d may be conveyed between the first conveyance unit 161a and the second inspection unit 170. The first auxiliary conveyance unit 162a may be configured as a roller conveyance device.

As illustrated in FIG. 2, a first auxiliary conveyance unit 162a_f, which is positioned at a most downstream side of the first auxiliary conveyance path 162, may have one side A connected to the second inspection unit 170 and the other side B connected to a second auxiliary conveyance unit 163a of the second auxiliary conveyance path 163 which will be described below.

The first auxiliary conveyance path 162 may include a first buffer unit 162b that stores the defect-determined panel P_d conveyed from the first conveyance unit 161a in a case in which re-inspection by the second inspection unit 170 pauses (for example, in a case in which the second inspection unit 170 is busy or stopped). The first buffer unit 162b may be a cassette device having multiple partitioned spaces in order to store the multiple defect-determined panels P_d. The first buffer unit 162b may be substituted for at least one of the first auxiliary conveyance units 162a, or the first buffer unit 162b may be provided on the first auxiliary conveyance unit 162a so as to be moved upward and downward. The description of the present invention will be made based on the configuration in which the first buffer unit 162b is the cassette device provided on the first auxiliary conveyance unit 162a so as to be moved upward and downward.

Meanwhile, during the typical process of conveying the defect-determined panel P_d when the second inspection unit 170 is in an idle state, the control unit may control the connection unit 160 so that the defect-determined panel P_d conveyed from the first conveyance unit 161*a* may be conveyed to the second inspection unit 170 via the first buffer unit 162*b*.

In addition, in a case in which the re-inspection by the second inspection unit 170 pauses (for example, in a case in which the second inspection unit 170 is busy or stopped), the control unit may control the connection unit 160 so that the defect-determined panel P_d conveyed from the first conveyance unit 161*a* may be stored in the first buffer unit 162*b*. Examples in which the re-inspection by the second inspection unit 170 pauses may include an example in which the panels inspected by the first inspection unit 150 are continuously determined as the defective panels and then the defect-determined panels P_d are continuously introduced through the first auxiliary conveyance path 162. The general reason is that an inspection speed of the first inspection unit 150 or a conveyance speed of the defect-determined panel P_d is generally higher than a re-inspection speed of the second inspection unit 170.

Further, in a case in which the conveyance of the panel positioned at an upstream side of the first buffer unit 162*b* is delayed (e.g., in a case in which the conveyance of the panel in the panel conveyance path 120 is delayed or stopped, the inspection by the first inspection unit 150 is delayed or stopped, or the panels inspected by the first inspection unit 150 are continuously determined as the good-quality panels), the control unit may control the connection unit 160 so that the defect-determined panel P_d stored in the first buffer unit 162*b* may be conveyed to the second inspection unit 170. In this case, the re-inspection by the second inspection unit 170 does not pause but may be smoothly performed because the introduction of the defect-determined panel P_d to the first buffer unit 162*b* is delayed, and as a result, the control unit may allow the re-inspection to be continuously performed by the second inspection unit 170 by supplying the defect-determined panel P_d stored in the first buffer unit 162*b* to the second inspection unit 170.

Meanwhile, the defect-confirmed panel P_d', which is sorted as the defective panel by re-inspection by the second inspection unit 170, is sent to a separate space. The good-quality-confirmed panel P_a', which is sorted as the good-quality panel, may be conveyed to the downstream device 200 and then conveyed to the second conveyance unit 161*b* via the second auxiliary conveyance path 163 so that a post-process may be performed on the good-quality-confirmed panel P_a'.

The first exemplary embodiment illustrated in FIG. 2 is configured such that the good-quality-confirmed panel P_a', which has been confirmed as the good-quality panel by re-inspection by the second inspection unit 170, is conveyed to the second auxiliary conveyance unit 163*a* on the second auxiliary conveyance path 163 via the first auxiliary conveyance unit 162*a_f* positioned at the most downstream side of the first auxiliary conveyance path 162.

The second auxiliary conveyance path 163 is connected to the second conveyance unit 161*b*, thereby forming a conveyance path bypassed from the main conveyance path 161. The second auxiliary conveyance path 163 may include the at least one second auxiliary conveyance unit 163*a*.

The multiple second auxiliary conveyance units 163*a* may be connected to one another in series to form a conveyance path through which the good-quality-determined panel P_a may be conveyed from the second conveyance unit 161*b*. The second auxiliary conveyance unit 163*a* may be configured as a roller conveyance device.

As illustrated in FIG. 2, any one of the second auxiliary conveyance units 163*a* for forming the second auxiliary conveyance path 163 may have a first side connected to the first auxiliary conveyance unit 162*a_f* at the most downstream side of the first auxiliary conveyance path 162. Therefore, the good-quality-confirmed panel P_a', which has been confirmed as the good-quality panel by the second inspection unit 170, may be introduced onto the second auxiliary conveyance path 163 via the first auxiliary conveyance unit 162*a_f* at the most downstream side.

The second auxiliary conveyance path 163 may include a second buffer unit 163*b* that stores the good-quality-determined panel P_a conveyed from the second conveyance unit 161*b*. The second buffer unit 163*b* may be a cassette device having multiple partitioned spaces in order to store the multiple good-quality-determined panels P_a. The second buffer unit 163*b* may be substituted for at least one of the second auxiliary conveyance units 163*a*, or the second buffer unit 163*b* may be provided on the second auxiliary conveyance unit 163*a* so as to be moved upward and downward. The description of the present invention will be made based on the configuration in which the second buffer unit 163*b* is the cassette device provided on the second auxiliary conveyance unit 163*a* so as to be moved upward and downward.

The second buffer unit 163*b* may store the good-quality-confirmed panel P_a' confirmed as the good-quality panel by re-inspection by the second inspection unit 170. Specifically, the control unit may control the connection unit 160 so that the good-quality-confirmed panel P_a' conveyed from the second inspection unit 170 may be stored in the second buffer unit 163*b* while the panel (e.g., the good-quality-determined panel P_a) is conveyed from the first conveyance unit 161*a* to the second conveyance unit 161*b*. Since the second buffer unit 163*b* stores the good-quality-confirmed panel P_a', it is possible to allow the second inspection unit 170 to continuously re-inspect the defect-determined panel P_d without hindering the conveyance of the good-quality-determined panel P_a from the first conveyance unit 161*a* to the second conveyance unit 161*b* in a case in which the good-quality-confirmed panels P_a', which have been confirmed as the good-quality panels, need to be continuously introduced to the second auxiliary conveyance path 163.

The control unit may control the connection unit 160 to stop the conveyance of the good-quality-confirmed panel P_a' from the second inspection unit 170 to the second auxiliary conveyance path 163 while the panel is conveyed from the second conveyance unit 161*b* to the second auxiliary conveyance path 163.

Specifically, it is necessary to convey the good-quality-determined panel P_a from the second conveyance unit 161*b* along the second auxiliary conveyance path 163 if the good-quality-determined panel P_a is introduced to the second conveyance unit 161*b* through the first conveyance unit 161*a* when the downstream device 200 pauses. Simultaneously, if there is the panel sorted as the good-quality-confirmed panel P_a' by re-inspection by the second inspection unit 170, it is necessary to introduce the good-quality-confirmed panel P_a' to the second auxiliary conveyance path 163 in order to perform the continuous re-inspection by the second inspection unit 170. However, if the second auxiliary conveyance path 163 is short and the good-quality-determined panel P_a and the good-quality-confirmed panel P_a' cannot be simultaneously introduced to the second buffer unit 163*b* in two directions, it is necessary to preferentially select any one of a first control for introducing the good-quality-determined panel P_a to the second auxiliary conveyance path 163 and a second control for introducing the good-quality-confirmed panel P_a' to the second auxiliary conveyance path 163. Among the entire panels conveyed through the optical film attachment system 100, the number of good-quality-determined panels P_a determined by the first inspection unit 150 may be larger than the number of good-quality-confirmed panels P_a' confirmed by the first inspection unit 150 and the second inspection unit 170, and as a result, the first control for introducing the good-quality-determined panel P_a to the second auxiliary conveyance path may be preferentially performed with respect to the second control for introducing the good-quality-confirmed panel P_a' to the second auxiliary conveyance path 163 in order to make an overall flow of the conveyance of the panels smooth. If the first control is selected, the conveyance of the good-quality-confirmed panel P_a' from the second inspection unit 170 to the second auxiliary conveyance path 163 is stopped, and simultaneously, as necessary, the re-inspection by the second inspection unit 170 may be stopped.

FIG. 5 is a conceptual view for explaining a first inspection unit, a connecting portion, and a second inspection unit according to a second exemplary embodiment. Constituent elements substantially identical to the constituent elements in the first exemplary embodiment are denoted by the same reference numerals, and repeated descriptions thereof will be omitted.

In the second exemplary embodiment, a second inspection unit 170 may have a first side 170a connected to a first auxiliary conveyance unit 162a_f positioned at a most downstream side of a first auxiliary conveyance path 162, and a second side 170b connected to a second auxiliary conveyance unit 163a/163b positioned at a most downstream side of a second auxiliary conveyance path 163. That is, the first auxiliary conveyance path 162 and the second auxiliary conveyance path 163 may be connected through the second inspection unit 170. Therefore, in the second exemplary embodiment, the good-quality-confirmed panel P_a', which has been sorted and confirmed as the good-quality panel by re-inspecting the defect-determined panel P_d introduced through the first auxiliary conveyance path 162, may be introduced directly to the second auxiliary conveyance path 163 without passing through the first auxiliary conveyance path 162.

According to the optical film attachment system 100 configured as described above, the connection unit 160, which connects the panel conveyance path 120 and the downstream device 200 and conveys the panel, includes the main conveyance path 161, the first auxiliary conveyance path 162 which bypass-conveys the defect-determined panel P_d from the main conveyance path 161, and the second auxiliary conveyance path 163 which bypass-conveys the good-quality-determined panel P_a from the main conveyance path 161 when it is difficult to convey the good-quality-determined panel P_a to the downstream device 200. As a result, it is possible to allow the conveyance to the second inspection unit 170 for re-inspecting the defect-determined panel P_d and the conveyance of the good-quality-determined panel P_a to the downstream device 200 not to hinder each other, and it is possible to smoothly manage a flow of the conveyance of the panel without decreasing a speed of the process of attaching the optical film in a case in which the speed of the process of attaching the optical film is higher than the process speed in the downstream device 200.

In addition, in the optical film attachment system 100, the first auxiliary conveyance path 162 includes the first buffer unit 162b that stores the defect-determined panel P_d conveyed from the first conveyance unit 161a in the case in which the re-inspection by the second inspection unit 170 pauses, and as a result, even in a case in which the panels inspected by the first inspection unit 150 are continuously determined as the defective panels in a situation in which the re-inspection by the second inspection unit 170 is busily performed or stopped, it is possible to manage the defect-determined panel P_d so that the defect-determined panel P_d may be continuously introduced through the first auxiliary conveyance path 162.

Further, in the optical film attachment system 100, the defect-determined panel P_d conveyed from the first conveyance unit 161a may be conveyed to the second inspection unit 170 via the first buffer unit 162b when the second inspection unit 170 is in an idle state, the defect-determined panel P_d conveyed from the first conveyance unit 161a may be stored in the first buffer unit 162b when the re-inspection by the second inspection unit 170 pauses, and the defect-determined panel stored in the first buffer unit 162b may be conveyed to the second inspection unit 170 when the conveyance of the panel positioned at the upstream side of the first buffer unit 162b is delayed, such that the re-inspection by the second inspection unit 170 and the introduction of the defect-determined panel P_d to the first auxiliary conveyance path 162 may be continuously performed without hindering each other.

In addition, in the optical film attachment system 100, the panel positioned on the second conveyance unit 161b may be conveyed to the downstream device 200 when the downstream device 200 is in an idle state, the panel positioned on the second conveyance unit 161b may be conveyed along the second auxiliary conveyance path 163 when the downstream device 200 pauses, and the panel positioned on the second auxiliary conveyance path 163 may be conveyed to the second conveyance unit 161b when the conveyance of the panel positioned at the upstream side of the second conveyance unit 161b is delayed, such that the conveyance of the panel on the panel conveyance path 120 and the process of attaching the optical film may be continuously performed without being affected by the situation of the downstream device 200.

Further, in the optical film attachment system 100, since the good-quality-confirmed panel P_a', which has been confirmed as the good-quality panel through the re-inspection by the second inspection unit 170, may be conveyed to the second conveyance unit 161b along the second auxiliary conveyance path 163, the good-quality-determined panel P_a, which has been determined as the good-quality panel by the first inspection unit 150, and the good-quality-confirmed panel P_a', which has been confirmed as the good-quality panel by the second inspection unit 170, are supplied to the main conveyance path 161 through the same second auxiliary conveyance path 163, thereby easily managing the supply of the panel.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

EXPLANATION OF REFERENCE NUMERALS AND SYMBOLS

100: Optical film attachment system
110: Panel supply unit

120: Panel conveyance path
130: First optical film conveyance path
140: Second optical film conveyance path
150: First inspection unit
160: Connection unit
161: Main conveyance path
162: First auxiliary conveyance path
162b: First buffer unit
163: Second auxiliary conveyance path
163b: Second buffer unit
170: Second inspection unit
200: Downstream device
P_a: Good-quality-determined panel
P_d: Defect-determined panel
P_a': Good-quality-confirmed panel
P_d': Defect-confirmed panel

The invention claimed is:

1. An optical film attachment system which is connected to a downstream device and includes a panel conveyance path for conveying a panel and attaching an optical film to the panel, the optical film attachment system comprising:
a connector which connects the panel conveyance path and the downstream device and conveys the panel;
a first optical inspector which is positioned on the panel conveyance path and determines whether the panel with the attached optical film has a defect based on a predetermined optical inspection reference; and
a second optical inspector which is positioned at a position spaced apart from the panel conveyance path and re-inspects a defect-determined panel determined as a defective panel by inspection by the first optical inspector;
wherein the connector includes a main conveyance path in which a first conveyor and a second conveyor are sequentially arranged in a conveyance direction of the panel conveyance path, a first auxiliary conveyance path which connects the first conveyor and the second optical inspector and is bypassed from the main conveyance path, and a second auxiliary conveyance path which is connected to the second conveyor and bypassed from the main conveyance path, a controller that controls the connector so that the defect-determined panel is conveyed from the first conveyor to the second optical inspector along the first auxiliary conveyance path when the panel inspected by the first optical inspector is determined as a defective panel, and a good-quality-determined panel determined as a good-quality panel by the first optical inspector is conveyed from the second conveyor along the second auxiliary conveyance path.

2. The optical film attachment system of claim 1, wherein the first auxiliary conveyance path includes a first buffer storage that stores the defect-determined panel conveyed from the first conveyor when the re-inspection by the second optical inspector pauses.

3. The optical film attachment system of claim 2, wherein the defect-determined panel conveyed from the first conveyor is conveyed to the second optical inspector via the first buffer storage when the second optical inspector is in an idle state, the defect-determined panel conveyed from the first conveyor is stored in the first buffer storage when the re-inspection by the second optical inspector pauses, and the defect-determined panel stored in the first buffer storage is conveyed to the second optical inspector when the conveyance of the panel positioned at an upstream side of the first buffer storage is delayed.

4. The optical film attachment system of claim 1, wherein the panel positioned on the second conveyor is conveyed to the downstream device when the downstream device is in an idle state, the panel positioned on the second conveyor is conveyed along the second auxiliary conveyance path when the downstream device pauses, and the panel positioned on the second auxiliary conveyance path is conveyed to the second conveyor when the conveyance of the panel positioned at an upstream side of the second conveyor is delayed.

5. The optical film attachment system of claim 1, wherein a good-quality-confirmed panel confirmed as a good-quality panel by re-inspection by the second optical inspector is conveyed to the second conveyor along the second auxiliary conveyance path.

6. The optical film attachment system of claim 1, wherein the second auxiliary conveyance path includes a second buffer storage that stores the panel conveyed from the second conveyor.

7. The optical film attachment system of claim 6, wherein the second buffer storage stores a good-quality-confirmed panel confirmed as a good-quality panel by re-inspection by the second optical inspector.

8. The optical film attachment system of claim 7, wherein the good-quality-confirmed panel conveyed from the second optical inspector is stored in the second buffer storage while the panel is conveyed from the first conveyor to the second conveyor.

9. The optical film attachment system of claim 7, wherein the conveyance of the good-quality-confirmed panel from the second optical inspector to the second auxiliary conveyance path is stopped while the panel is conveyed from the second conveyor along the second auxiliary conveyance path.

* * * * *